June 17, 1969

A. GENTILINI 3,450,470

CINEMA PROJECTOR FOR FILMS WITH SINGLE LATERAL PERFORATION
FOR EACH FRAME AND WITH OPTICAL COMPENSATION OF
THE UNIFORM MOTION OF THE FILM

Filed Oct. 4, 1965

INVENTOR.
AUGUSTO GENTILINI
BY
McGlew & Toren
ATTORNEYS.

United States Patent Office 3,450,470
Patented June 17, 1969

3,450,470
CINEMA PROJECTOR FOR FILMS WITH SINGLE LATERAL PERFORATION FOR EACH FRAME AND WITH OPTICAL COMPENSATION OF THE UNIFORM MOTION OF THE FILM
Augusto Gentilini, 36 Via dei Mille, Rome, Italy
Filed Oct. 4, 1965, Ser. No. 492,416
Int. Cl. G03b *41/00*
U.S. Cl. 352—109
8 Claims

ABSTRACT OF THE DISCLOSURE

A cinematographic projector, for films with a single lateral perforation for each frame, is formed of a curved guide having a pair of openings spaced in the direction of travel of the film. A tooth is secured to a pivotally positionable mirror and extends through one of the openings in the guide into engagement with a perforation in the film. As the tooth is driven by the film it pivots the mirror and compensates for the uniform motion of the film. Lens means are provided for directing light through the film at the other opening in the guide and onto the mirror for reflection onto a screen.

---

This invention refers to cinematographic projectors for films with single lateral perforation for each frame and with optical compenation of the uniform motion of the film.

In ordinary film projectors, the film advances, intermitantly and so they are very complicated from the mechanical point of view. Furthermore, the presence of loops of film, necessary for the intermittent movement, renders the operation of loading ardous and lengthy. Lastly, and excluding further complications, such projectors are not suitable for post-scoring on account of the intermittent movement.

On the other hand, for rough and provisional projection of the film with simpler and more economic means, the so-called moviola is well known. With the latter, however, in the case of 16 mm. films, the movement of the film is generally done by hand, and because of the instability of the image, they are only suitable for editing.

In order to allow the films to move with a continuous uniform flow, the cinema projector makes use of optical compensation obtained, for example, by means of a rotating or oscillating lens or mirror. In particular, the oscillation of the mirror is obtained by means of a mechanism which, with gears or other complicated methods of transmission, is controlled by the mechanism for moving the film. Attempts have also been made to obtain the oscillation of the mirror directly from the perforation of the film, without, however, achieving a satisfactory solution either for the problem of optical compensation or for the mechanical one of excessive stress on the perforation.

The technical means known at present, do not permit the manufacture of a low cost projector run on a battery, automatically, with sound, allowing immediate loading, possibly portable and with a built-in screen.

These and other drawbacks are avoided in the projector embodying the present invention, which affords optical compensation of the uniform movement of the film by means of an oscillating mirror which may be turned directly by the perforation of the film against the action of a turning spring with an amount of travel each time corresponding substantially to the length of a frame. This arrangement has the characteristic that the tooth for turning the mirorr gives elastically towards the fulcrum of the oscillation of the mirror and cooperates with a fixed catch which releases the tooth from the perforation at the end of the turn.

This and other characteristics of the invention will become clear from the following description and reference to the attached drawings, where:

Figure 1:
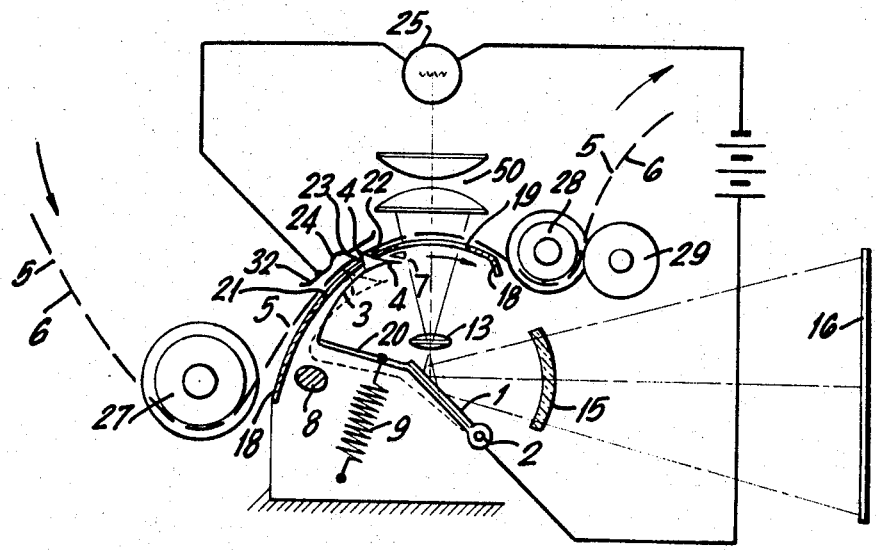
FIG. 1 is a diagrammatical showing of a projector embodying the present invention.

Referring to FIG. 1, 6 indicates generally a film with single lateral perforation, 5 for each frame. The film 6 is normally drawn with uniform movement in the direction of the arrows by a continually rotating roller 28, against which the film 6 is pressed by a pressure roller 29. Spaced from the roller 28 is another roller 27 for guiding the film 6 so that it runs over a rigid curved guide or leading rail 18. The film 6 unwinds from a feed reel and is taken up by a collecting reel, not shown in the drawing.

An opening 19 of dimensions roughly corresponding to the size of a frame has been made in the curved leading rail 18. The radius of this curved leading rail 18 in containing the aperture 19 is equal to the focal length of a lens 13 which has been placed at the centre point of the above mentioned curve. To obtain optical compensation of the uniform film movement, an oscillating mirror 1 fitted on a supporting section 20, pivoting at 2 and equipped with a transporting tooth 4 which is carried by the perforation 5 of the film 6 and recoils through the action of a returning spring 9.

Taken by itself, the transporting tooth 4 gives elastically towards the fulcrum of the oscillation 2 as this tooth is mounted on to a flexible arm 3 of the supporting section 20 which is substantially designed as an arc of a circle with its centre at the fulcrum. The tooth 4 projects through a second opening 21 in the curved guide 18, which extends in the direction of the film movement and which corresponds substantially to the length of one frame. The radius of the curved guide 18 at the position of the second opening is equal to twice the focal length of lens 13 and its centre is situated at fulcrum 2.

The transporting tooth 4 is linked to a fixed catch 7 which serves to extract said tooth 4 from the perforation 5 at the termination of the film movement. For this purpose, the tooth 4 and catch 7 have both been fitted with a cam-type profile, in this case cam-type profile 22 of tooth 4, have been designed in such a way that when they meet, the tooth 4 is retracted towards fulcrum 2 and is disengaged at the same time from the perforation 5. The profile 23 of tooth 4 facing against the movement of the film (i.e. towards the left on FIG. 1) has been designed in the form of the arc of a circle having a centre in the point where lever 3 is fixed on to the supporting section 20.

The beams emitted by light source 25 and gathered by condenser 50 at lens 13, after passing through one frame of the film 6 and opening 19, are reflected by mirror 1 on to a screen 16.

The projector operates in the following way:

During the uniform motion of the film 6 in the direction of the arrow, tooth 4 engages the first perforation 5, is carried by it together with supporting section 20 which rotates clock-wise round fulcrum 2 until it is stopped by catch 7. Under this action, tooth 4 is displaced from perforation 5; this displacement being aided by the form of the profile 23 thus allowing the return counter-clock-wise movement of supporting section 20 under action of the recoil-spring 9 up to the fixed catch 8, thereby taking up the position indicated by a dotted line in the figure, while tooth 4, passing underneath the film is caught and carried on by the next perforation 5. In order to absorb the shock of the supporting section 20, catch 8 may be designed with adequate flexibility.

During each forward oscillation of section 20 the movement of mirror 1 compensates for the continuous run of the film passing in front of opening 19 and causing the image which is projected by mirror 1 on to screen 16 to appear unblurred.

Running the film in reverse, i.e. in the opposite direction of the arrow, roller on sprocket 27 can be shifted towards the left, in any adequate way, thereby removing the film from tooth 4.

The projector herein described may be put to different uses.

The version described, which is shutterless, is particularly suitable for a sub-standard film stock projector for short operation or for an extermely cheap moviola. In the case, however, one should want to fit it with a shutter, an electric contact slip 32 in circuit with the light source 25 can be designed in a position aligned opposite the aperture 21 as that it is touched by tooth 4 during the forward run of the oscillation thus closing the electric circuit of the light source 25. On the return run, the circuit will remain open because tooth 4 passes underneath film 6 thus rendering the change of the film frame invisible to the eye. To increase the quality of the projected image according to a known system, the slip 32 will be designed with at least one concave area 24, causing the tooth to jump or lose contact, thus interrupting the current for a fraction of a second. One can, of course, substitute the concave area by an insulated area, which would have the same effect.

The described projector can be built with extremely economical means: supporting section 20 with arm 3 and tooth 4, for instance, can be made of a single piece of plate, suitably cut and bent and of a sufficiently light weight and flexibility to ensure good performance.

The projector can be designed with a constant focus, allowing for an additional fixed lens 15 to correct the possible tolerances of the various components. This lens will be chosen from a suitable collection of additional lenses.

Figure 2:
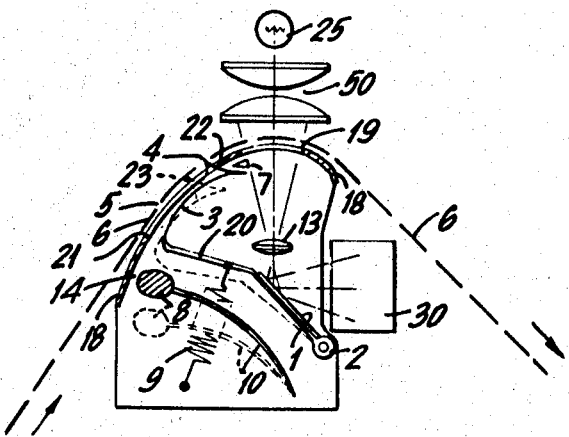
FIG. 2 is a variation of the projector shown in FIG. 1.
Figure 3:
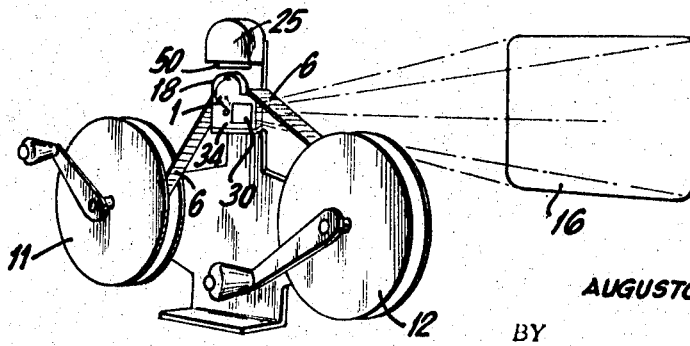
FIG. 3 is a front view of a hand moviola fitted with the projector shown in FIG. 2.

The characteristics of the variation shown on FIGS. 2 and 3 are: hand driven reels 11 and 12, the different design of the film flow as shown in FIG. 2 and, with exception of the handles on the reels, the lack of any mechanical means to move the film.

A prism 30 deflects the image reflected by mirror 1 in respect of the axis of the reels, projecting it underneath the film 6 on to screen 16 thus enabling the operator of the moviola, who is sitting in front of it, to view the screen 16 over the top of the above mentioned moviola. Guide 18 is mounted on a fixed support 34 and on to part 14 at the height of the catch 8, and its radius of curvature is larger than that at its aperture 21: in this way, during the reverse movement of the film, i.e. opposite to the arrows, the film is automatically displaced from tooth 4 because catch 8 is mounted on a flexible arm 10 thus allowing support 20 to press on arm 10 until this piece reaches the position shown by a dotted line on the drawing. Aperture 21, for obvious reasons, extends further down if compared to aperture 21 as shown on FIG. 1. The image can also be viewed directly on prism 30 rather than on the screen 16.

A large number of improvements and variations can be made to this projector while staying within the limits of this invention.

Having thus described the invention, what is claimed and desired to be secured by Letters Patent is:

1. A cinematographic projector for films with a single lateral perforation for each frame is comprised of a curved guide having a different radii of curvature along its length and having an outer convex surface and an inner concave surface, means for traveling film along the outer concave surface of said guide, said guide having a first opening spaced from a second opening and the openings extend in the direction of travel of the film on the guide, the first opening is disposed before the second opening on the path of travel of the film, a mirror is pivotally mounted on and spaced from the inner surface side of said guide and is arranged to reflect light passing through the second opening, a light source disposed outwardly from the outer surface of said guide, means disposed on the outer surface side and on the inner surface side of said guide for condensing and collecting the light beams from the light source transmitted through the second opening and directing them onto said mirror, a support member secured to said mirror extending therefrom toward the inner surface of said guide, a tooth secured to said support member and extending therefrom through the first opening in said guide and arranged to engage perforations in said film whereby the tooth and the mirror secured thereto is transported by the film and said mirror is pivoted as the film passes over said guide, and means for unlatching said tooth from the perforation in the film at the end of its passage through said first opening.

2. A cinematographic projector as set forth in claim 1, wherein said means for collecting the light passing through said film comprises a lens having a focal distance, said guide having a radius of curvature at its first opening equal to twice the focal distance of said lens, and said guide having a radius of curvature at its second opening equal to the focal distance of said lens.

3. A cinematographic projector as set forth in claim 1, wherein an electric contact member is positioned on the outer surface side of said guide opposite the first opening therethorugh, said tooth arranged to project through said first opening when engaged within a perforation in said film for extending into contact with said contact member for at least a portion of the extent of travel of said tooth through said first opening.

4. A cinematographic projector as set forth in claim 1, wherein at least a portion of said support member extends along and in spaced relationship with the inner surface of said guide, and said portion of said support member forming an arc of a circle having its center located at the pivot point of said mirror.

5. A cinematographic projector as set forth in claim 1, wherein a recoil spring is secured to said support member for returning said tooth to the opposite end of the first opening after it is released from the perforation in the film by said unlatching means.

6. A cinematographic projector as set forth in claim 5, wherein a flexible catch is disposed on the inner surface side of said guide acting at a stop for the recoil action of said tooth and support member.

7. A cinematographic projector for films for single lateral perforation for each frame and with optical compensation for uniform motion of the film obtained through an oscillating mirror directly driven by the film perforation and recoiling through the action of a return spring with a length of run corresponding to the length of one frame of the film, characterized by the fact that a tooth is connected to said mirror for driving the mirror about the fulcrum of oscillation of the mirror and acts jointly with a fixed catch which causes displacement of said tooth from the perforation in the film at the end of the run, an electric contact strip arranged to be contacted by said tooth while it is in engagement within a perforation in the film, and said strip having at least one concave area suitable to interrupt the contact of the driving of the tooth therewith.

8. A cinematographic projector for films for single lateral perforation for each frame and with optical compensation for uniform motion of the film obtained through an oscillating mirror directly driven by the film perforation and recoiling through the action of a return spring with a length of run corresponding to the length of one frame of the film, characterized by the fact that a tooth is connected to said mirror for driving the mirror about the fulcrum of oscillation of the mirror and acts jointly with a fixed catch which causes displacement of said tooth from the perforation in the film at the end of the run, an electric contact strip arranged to be contacted by said tooth while it is in engagement within a perforation in the film, and said strip having at least one insulated area intermediate its length in contact with the tooth suitable to interrupt the contact of the tooth from the remainder of said strip.

References Cited

UNITED STATES PATENTS

| 1,968,938 | 8/1934 | Goldhammer | 352—109 |
| 2,473,625 | 6/1949 | Wheeler | 352—200 X |
| 2,616,332 | 11/1952 | Sorkin | 352—200 X |
| 3,330,616 | 7/1967 | Teeple | 352—109 |

FOREIGN PATENTS

| 1,251,260 | 12/1960 | France. |
| 138,629 | 8/1934 | Germany. |

NORTON ANSHER, *Primary Examiner.*

M. H. HAYES, *Assistant Examiner.*

U.S. Cl. X.R.
352—167, 200